United States Patent [19]

Theis et al.

[11] Patent Number: 4,559,416

[45] Date of Patent: Dec. 17, 1985

[54] TELEPHONE LINE ACTIVITY MONITOR

[75] Inventors: Peter F. Theis, McHenry; Gregory D. Buchberger, Mount Prospect, both of Ill.

[73] Assignee: Morgan Industries, Inc., Curnee, Ill.

[21] Appl. No.: 541,366

[22] Filed: Oct. 12, 1983

[51] Int. Cl.$^4$ .......................................... H04M 15/32
[52] U.S. Cl. ............................ 179/7.1 R; 179/84 VF
[58] Field of Search ................. 179/7.1 R, 18 B, 7 R, 179/18 AB, 18 FA, 175.2 C, 8 A, 84 VF; 381/56, 60

[56] References Cited

U.S. PATENT DOCUMENTS 3,806,665 4/1974 Goldberg ............................... 179/99
4,270,024 5/1981 Theis et al. ........................... 179/8 A

OTHER PUBLICATIONS

Operator Position Assistance System, J. R. Cass, A. D. Smith, Electrical Communication, vol. 55, No. 3, 1980, pp. 169–176.

Primary Examiner—Stafford D. Schreyer
Attorney, Agent, or Firm—Willian Brinks Olds Hofer Gilson & Lione Ltd.

[57] ABSTRACT

A line activity monitor for a plurality of telephone lines operates to record a log for each call indicative of the time at which the telephone line entered each of a plurality of states during the call. In this way, complete information regarding line usage is recorded for each call, and the use of averages or summary statistics is avoided. Detailed analysis can then be applied to the information contained in the logs, tailored to the individual application. The disclosed line activity monitor also acts to record a coded signal with each log. This coded signal is generated by an operator following the answering of an incoming call, and can be used to indicate the purpose of the call to further enhance the line usage statistics developed from the information in the logs. The disclosed line activity monitor also distinguishes between the presence and absence of voice during the time the line is in an off-hook condition in order to enable the effective tabulation of nonproductive periods, whether or not the A and A1 control leads are used to place the line on hold.

21 Claims, 8 Drawing Figures 4,559,416

TELEPHONE LINE ACTIVITY MONITOR

BACKGROUND OF THE INVENTION

The present invention is directed to an improved line activity monitor for monitoring and recording information indicative of the usage of one or more telephone lines.

A variety of telephone line activity monitors are known to the prior art. One example is described in our previous U.S. Pat. No. 4,270,024. The monitor disclosed in this patent operates as described to record information which summarizes important aspects of the usage patterns of a set of telephone lines. For example, the disclosed monitor stores information related to the total number of calls on a line, the total number of unanswered calls, the total number of outgoing calls, the total number of calls abandoned by a caller while on hold, and the total number of calls serviced for predetermined time intervals, and so forth. This monitor has been found useful in a wide variety of business applications.

However, the monitor described in the above-identified patent is not without disadvantages. Since it operates to record summary information regarding multiple calls, it can only provide the particular classes of information for which it has been programmed. For example, the disclosed embodiment in the above-identified application does not operate to provide information as to the number of calls which were placed on hold during two separate time periods each of which was greater than one minute. Thus, this monitor is a preprogrammed monitor which operates well for many applications, but which is not sufficiently flexible to provide desired information in all situations.

Furthermore, the disclosed monitor tabulates information on all incoming calls, regardless of the nature of the call. Thus, the disclosed monitor cannot be used to analyze usage patterns characteristic of a particular type of call.

Typically, telephone centers handle a variety of types of calls. For example, a retail order desk may handle not only merchandise orders but also merchandise inquiries, credit inquiries, the return of merchandise, and the like. In many cases it is important in analyzing telephone center usage patterns to classify incoming calls according to the nature of the call. For example, it may be important to know what percentage of incoming calls are merchandise orders, and what usage patters are characteristic of that type of call. In the past this has been done by having operators manually record peg counts on a spread sheet. This approach introduces substantial inaccuracies because operators often fail to make the peg count at the time the call was handled, but rather attempt to do so later, several at a time, as they attempt to recall situations. Furthermore, this manual approach of the prior art does not enable traffic analysis to relate call characteristics to a particular type of call. For example, this prior art manual approach would not allow a determination that credit inquiry calls are typically very short in conversation times but inordinately long in on hold times.

Thus, a need exists for an improved telephone line activity monitor with increased flexibility, both with regard to the manner in which usage parameters are recorded, and the types of usage parameters which are recorded.

SUMMARY OF THE INVENTION

The present invention is directed to an improved telephone line activity monitor which to a large extent overcomes the disadvantages discussed above.

One feature of the monitor of this invention is that more complete information relating to the usage of the telephone line is recorded, on a call-by-call basis. According to this feature of the invention, the monitor does not operate to generate summary statistics characteristic of a large number of individual calls. Rather, the preferred embodiment of the invention described below operates to record a log for each call indicative of the usage pattern measured during that call. By recording such detailed information on a call-by-call basis, the monitor of this invention is well adapted for use as an input device to a separate processing system which can perform the particular analysis suited for any particular application. Thus, by separating recording functions from analysis functions, this feature of the invention provides a monitor of increased flexibility.

According to a second feature of this invention, a monitor is provided which responds to coded signals generated by an operator in response to the nature of an incoming call. These coded signals are then used in processing the usage information associated with that call. For example, in the embodiment described below, a monitor is provided which responds to coded touch-tone signals generated by an operator following the answering of an incoming call. For example, the operator can enter a first code when an incoming call is a credit inquiry, and a second, different code when the incoming call is a merchandise inquiry. The monitor then utilizes these coded signals to allow line usage information for a particular call to be processed in accordance with the respective coded signal and therefore the nature of the call.

According to a third feature of this invention, an improved monitor is provided which distinguishes between the presence and absence of voice signals on a line which is being serviced. By recognizing and classifying periods of time characterized by an absence of voice signals separately from periods of time characterized by a presence of voice signals, this monitor allows more detailed analysis of the usage patterns of the telephone line. Thus, if an operator has the habit of merely placing a receiver on a desk rather than placing the line on hold, such constructive on hold time will be recognized for what it is, and distinguished from time in which communications are being carried by the telephone line.

As will be described below in detail, these features of the invention provide important advantages in terms of increased flexibility and more accurate, more complete recording of telephone line usage parameters. The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
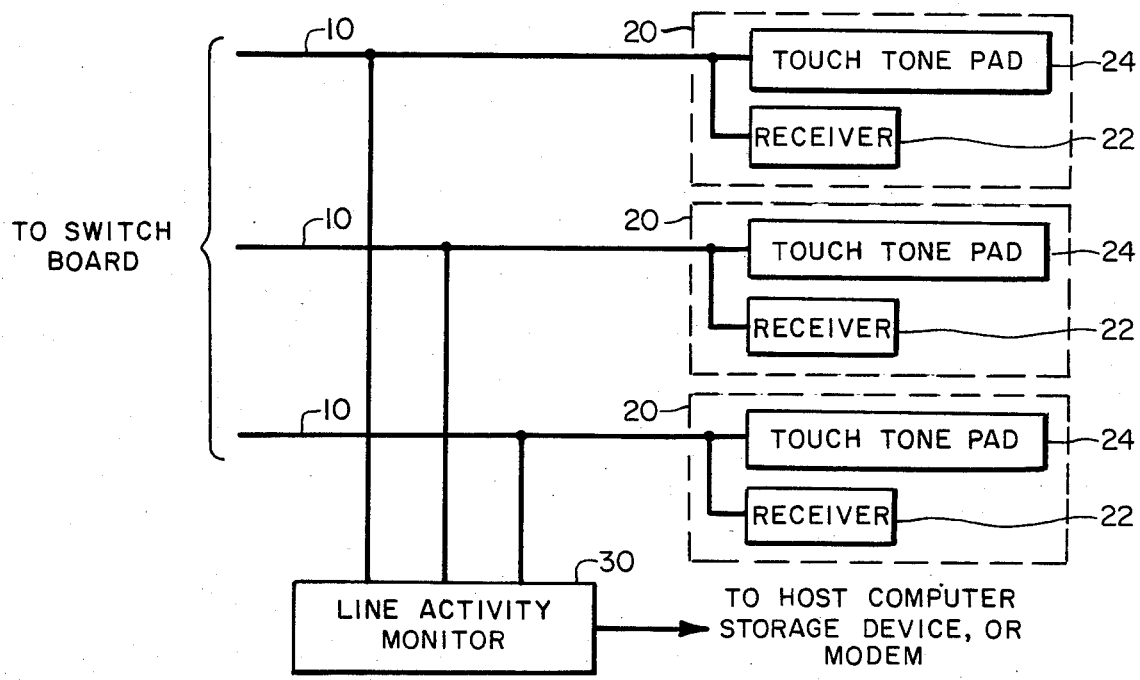
FIG. 1 is a block diagram of a line activity monitor which incorporates a presently preferred embodiment of this invention.

Turning now to the drawings, FIG. 1 shows a general block diagram of a line activity monitor 30 which incorporates a presently preferred embodiment of this invention. As shown in FIG. 1, the line activity monitor 30 is coupled to three telephone lines 10. Of course, it will be understood that in practice the line activity monitor 30 can readily be adapted to any desired number of telephone lines, and three lines have been shown merely by way of illustration.

Each of the telephone lines 10, in addition to being coupled to the line activity monitor 30, is coupled to a respective operator station 20. Each of the operator stations 20 includes a receiver 22 and a twelve key Touch-Tone pad 24 of the type typically used for telephone dialing. An operator at any of the operator stations 20 can carry on conversations via the respective receiver 22 and telephone line 10, and can generate coded signals on the Touch-Tone pad 24 which are passed via the telephone lines 10 to the monitor 30, as will be described in detail below.

Figure 2:
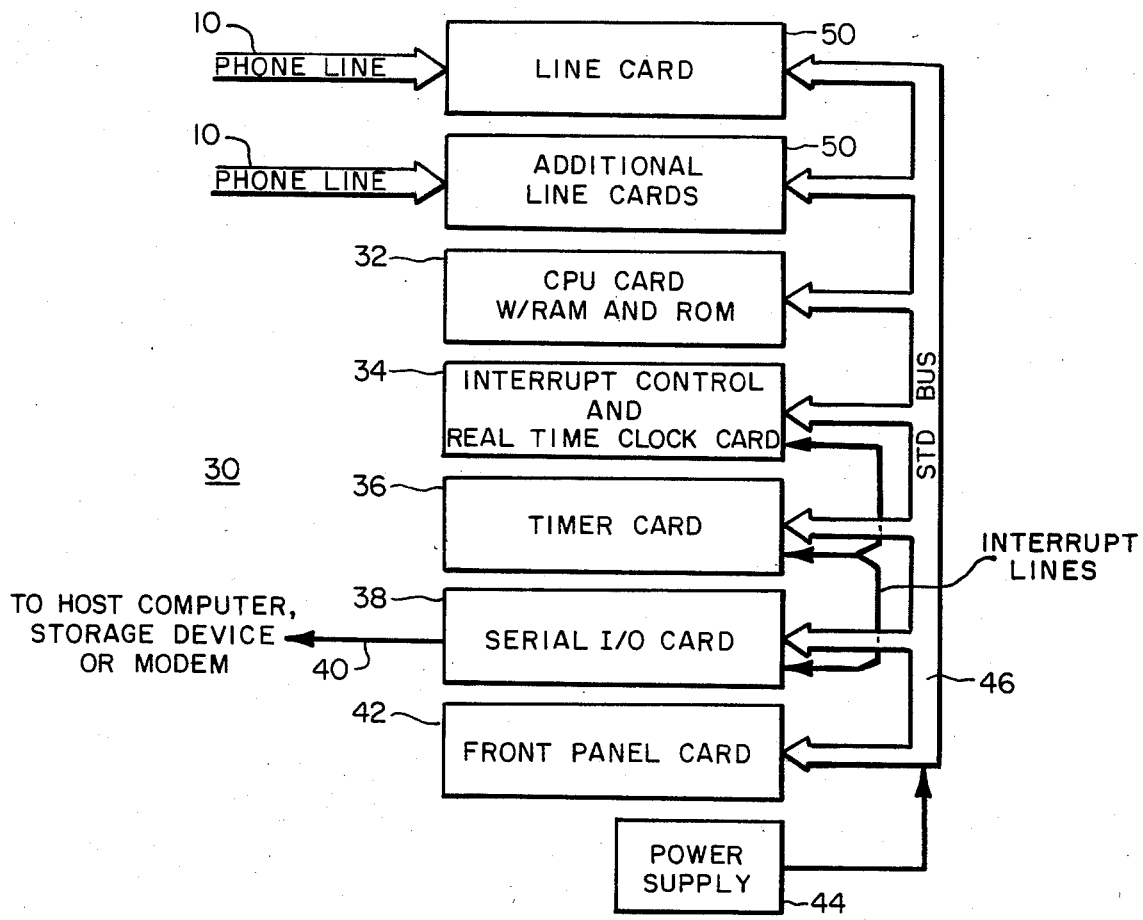
FIG. 2 is a more detailed block diagram of the line activity monitor of FIG. 1.

The monitor 30 is shown in block diagram form in FIG. 2. This monitor 30 is a microprocessor based system which is made up of a number of circuit cards including a CPU card 32, an interrupt control and real time clock card 34, a timer card 36, a serial I/O card 38 and a front panel card 42. Each of these cards is supplied with power generated by a power supply 44 and the various cards are interconnected by a standard bus 46.

It will be appreciated that the circuit cards 32-42 cooperate to form a microcomputer having real time and timer capabilities as well as a serial I/O capability for transmitting data via a line 40 to a host computer, storage device, modem, or the like. Purely by way of example, the cards 32,36,38,42 can be implemented as card numbers 7801, 7308, 7304, and 7303, respectively of the Pro-log Company. In this embodiment, the CPU card 32 is provided with 1K of RAM and 8K of ROM, and the CPU card 32 includes an 8-bit 8085a processor. Similarly, only by way of example, the interrupt control and real time clock card 34 can be embodied as Part No. RTC-20 of the Quasitronics Company. Such components are well known to those skilled in the art, and their mechanical structure does not per se form part of this invention. For that reason, they will not be described in greater detail here.

As shown in FIG. 2, the monitor 30 also includes a number of line cards 50, one for each of the telephone lines 10. These line cards 50 receive signals from the telephone lines as inputs and are coupled via the bus 46 to the CPU card 32.

Figure 3:
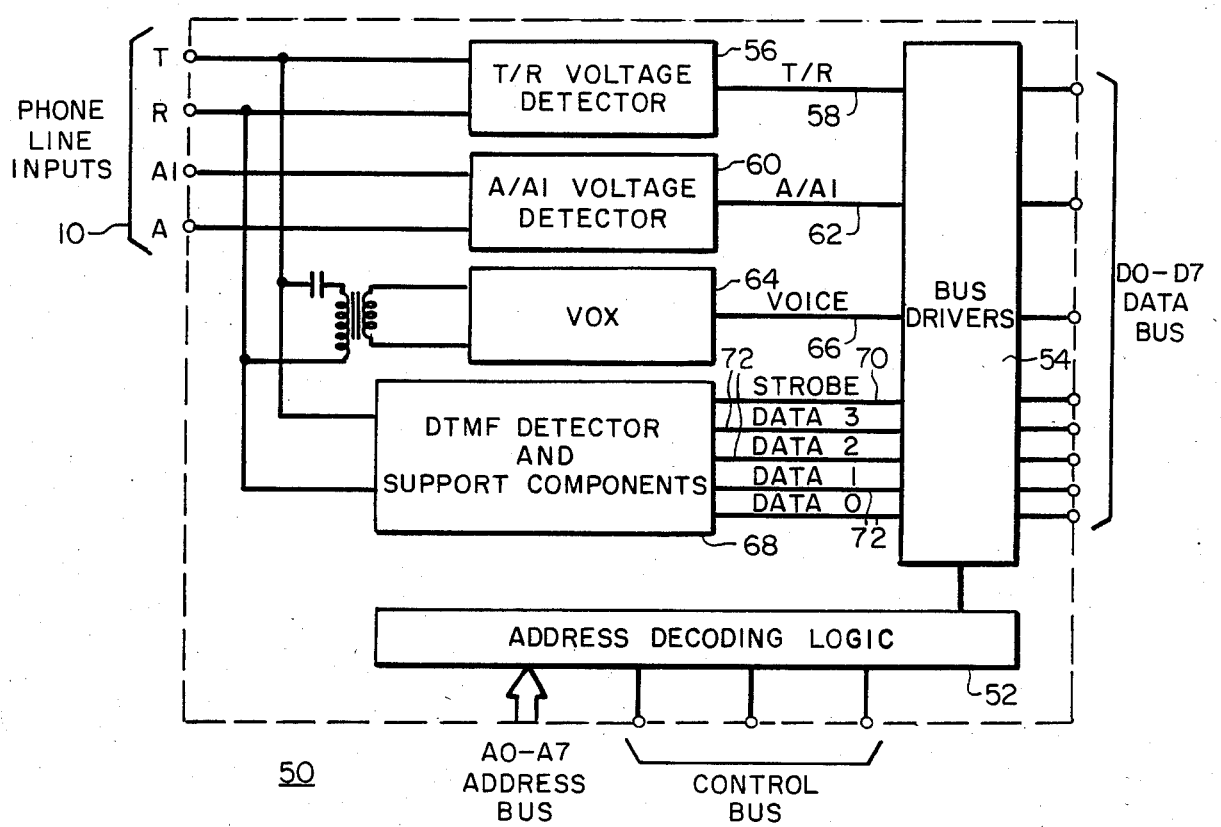
FIG. 3 is a more detailed block diagram of the line card of FIG. 2.

FIG. 3 shows a more detailed block diagram of one of the line cards 50. As shown in FIG. 3, each of the line cards 50 receives four inputs corresponding to the tip, ring, A1, and A leads of one of the telephone lines 10. These four leads are standard components of telephone line circuitry, and are well known to those skilled in the art. Each of the line cards 50 includes an address decoding circuit 52 which acts to control a set of bus drivers 54 in the conventional manner. Thus, when the address decoding circuit 52 detects a proper set of address command signals on the bus 46, it enables the bus drivers 54 to supply data signals to the CPU card 32 via the bus 46. The bus drivers 54 serve to gate signals from four separate sources of data signals: the T/R voltage detector 56, the A/A1 voltage detector 60, the VOX circuit 64, and the Dual Tone Multi-Frequency (DTMF) detector 68.

Figure 4:
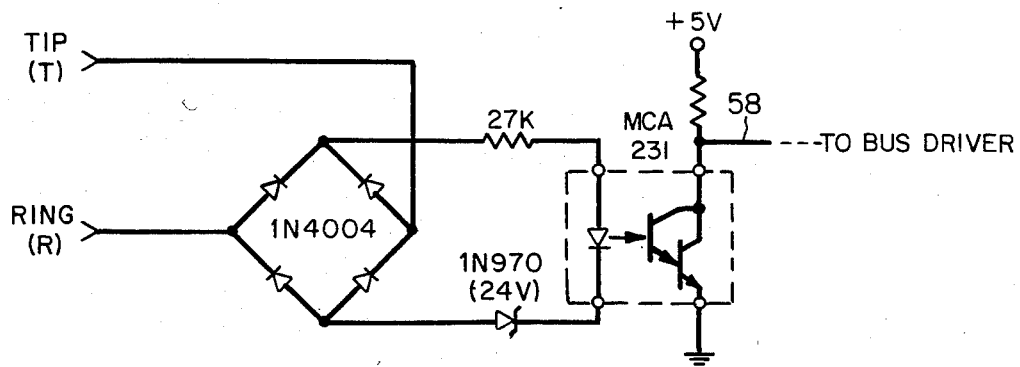
FIG. 4 is a more detailed schematic diagram of the T/R voltage detector of FIG. 3.

The T/R voltage detector 56 receives as inputs the tip and ring signals from the associated one of the telephone lines 10. The detector 56 operates to generate a signal on line 58 indicative of the voltage between the tip and ring leads. FIG. 4 shows a detailed circuit diagram of the circuitry of the detector 56. In this embodiment, the signal on line 58 enters the logic low state when the tip-ring voltage exceeds 40 VDC, and enters the logic high state when the tip-ring voltage falls below 40 VDC.

Figure 5:
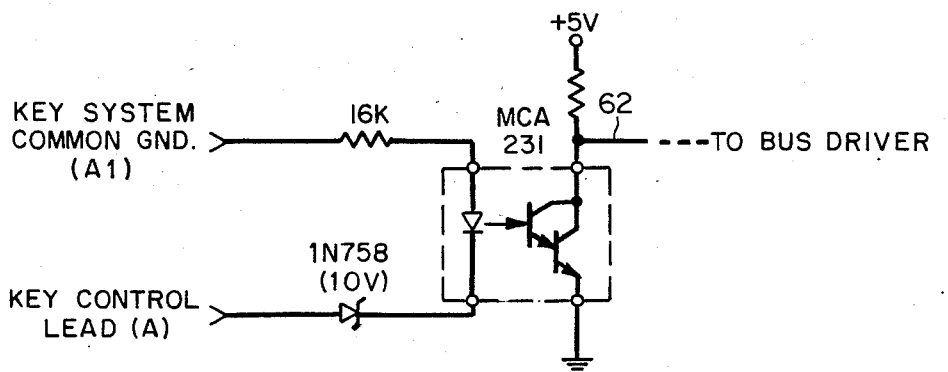
FIG. 5 is a schematic diagram of the A/A1 voltage detector of FIG. 3.

Similarly, the A/A1 voltage detector 60 receives the A and A1 signals as inputs from the telephone line 10 and operates to generate a logic signal on line 62 indicative of the voltage between the A and A1 leads. FIG. 5 shows a schematic diagram of the detector 60. In this embodiment, the signal on line 62 enters the logic low state when the voltage across the A and A1 leads exceeds 20 VDC, and the signal enters the logic high state when the voltage across the A and A1 leads falls below 20 VDC.

The VOX circuit 64 is coupled as shown in FIG. 3 by means of a capacitor and a transformer to the tip and ring leads. The VOX circuit 64 generates a digital signal on line 66 indicative of the presence or absence of voice signals on the tip and ring leads of the telephone line 10. In this embodiment, the VOX circuit 64 includes a standard, prior art syllabic detector which places the signal on line 66 in a first digital state approximately 5 seconds after the detection of voice on the tip and ring leads, and places the signal on line 66 in a second digital logic state approximately 5 seconds after the last detection of voice on the tip and ring leads. This 5-second delay is selected to prevent the signal on line 66 from changing state during normal pauses in conversation, but to indicate significant lapses in conversation, as for example when a receiver is placed on a desk and an operator interrupts the conversation to obtain necessary information requested by the caller.

The DTMF detector 68 can be, for example, a circuit such as that marketed by the Teltone Company as Model M-927 DTMF Receiver. The detector 68 monitors signals on the tip and ring leads of the telephone line 10 and generates digital output signals when specified inputs, such as conventional Touch-Tone signals, are recognized on the tip and ring leads. Once such a Touch-Tone signal is recognized by the detector 68, the detector 68 generates a strobe signal on line 70 and digital data signals on line 72 indicative of the particular Touch-Tone detected.

The digital signals on lines 58,62,66 and 70-72 are all applied to the bus drivers 54 and via the bus drivers 54 to the data bus included in the bus 46. It is these input signals which are processed by the monitor 30 to detect the state of the telephone line and the time at which the telephone line changes state.

Figure 6:
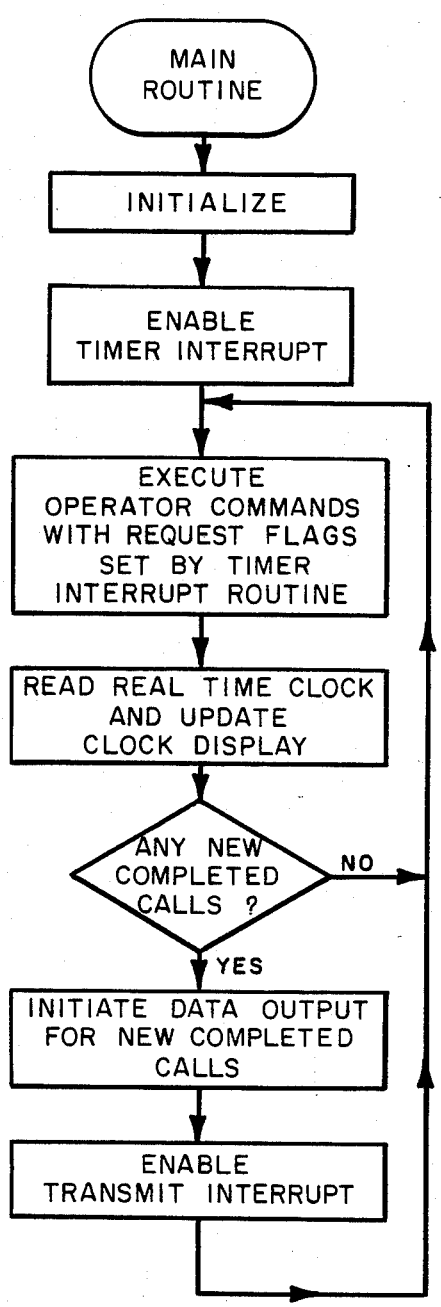
FIGS. 6, 6a and 6b are flow charts of the program executed by the CPU card of FIG. 2.
Figure 6A:
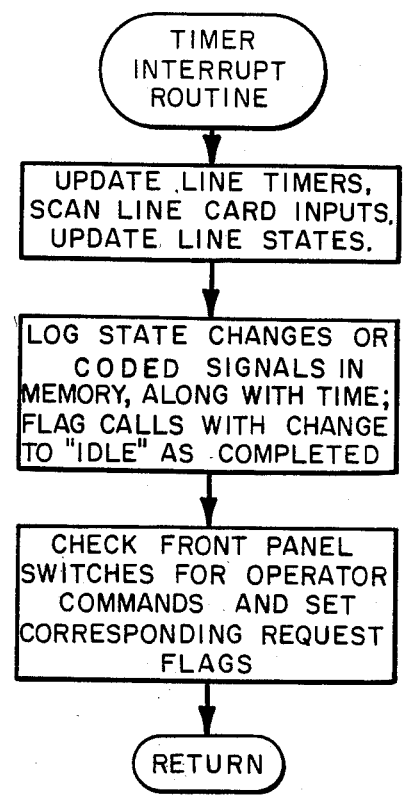
Figure 6B:
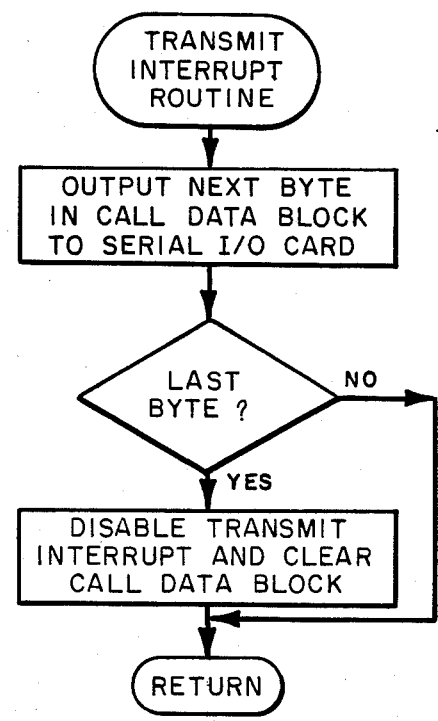

FIGS. 6-6b are flow charts of the program executed by the processor included in the CPU card 32. FIG. 6a represents the timer interrupt routine and FIG. 6b represents the transmit interrupt routine. Together, these two interrupt routines perform the major functions of the monitor 30.

The timer interrupt routine of FIG. 6a is a routine which is executed on a regular basis, as for example every 10 milliseconds. The first step in the timer interrupt routine is to update the line state of each of the telephone lines 10. As used herein, the term "line state" is used to refer to the instantaneous state or mode of operation of the telephone line. As shown in Table 1, there are five basic states of the telephone line recognized by the monitor 30: IDLE, RING, INTER-RING, SERVICED, and ON HOLD. In this embodiment, the SERVICED state is subdivided into two additional states, VOICE and NO-VOICE, depending upon whether or not the VOX circuit 64 has recognized the presence or absence of voice signals on the tip and ring leads of the associated telephone line. Table 1 defines each of the possible states of the telephone line. In general, the IDLE state corresponds to no activity on the telephone line, i.e., the line is on hook and the line is not ringing nor is it between rings. The RING state corresponds to the presence of a ring signal on the telephone line, as generated by the central switching station. The INTER-RING state corresponds to the period between rings. The SERVICED state corresponds to the line off hook and not on hold. As mentioned above, the SERVICED state includes the two states of VOICE in which the presence of voice signals is detected on the telephone line, and NO-VOICE in which the absence of voice signals is detected on the telephone line. The ON HOLD state corresponds to the telephone line 10 being off hook and placed on hold.

The timer interrupt routine of FIG. 6a operates to determine the line state in the same manner as that described in U.S. Pat. No. 4,270,024 at Column 5, line 4 through Column 6, line 22, and shown in FIGS. 4a and 4b, with two major exceptions. First, the SERVICED state discussed in the above-identified U.S. Pat. No. 4,270,024 is in this embodiment broken down into two component states (VOICE and NO-VOICE) in accordance with whether or not the signal on line 66 is indicative of the presence or absence of speech on the telephone line 10. Second, the line state detection algorithm includes algorithms for detecting coded signals on lines 72 and recording the detection of such coded signals. Line timers utilized in the timer interrupt routine are the same as those described in the above-identified portions of U.S. Pat. No. 4,270,024.

The next step in the timer interrupt routine is to log changes in state of the telephone lines and coded signals detected by the detector 68 in computer memory, along with the time at which each change in state occurred or the coded signal was detected. In addition, the timer interrupt routine sets a flag when a telephone line has returned to the IDLE state, indicative of the termination of a call on that line. The timer interrupt routine then checks front panel switches for operator commands such as diagnostic commands or clock setting commands and sets corresponding request flags.

Table 2 provides an example of the manner in which line state is logged in computer memory by the timer interrupt routine. The example of Table 2 corresponds to an entire log for one exemplary completed call. Of course, it should be understood that the length of any particular log will vary in accordance with the history of the associated call, with longer or more complex calls generally resulting in more extensive logs.

As shown in Table 2, the first entry in this log records when a call was initiated on line k in real time (hours, minutes, seconds). If desired, the monitor 30 can be programmed to record the date in addition to the time. The next nine entries in the log each define a line state and the elapsed time at which the line entered each of these states. This elapsed time measurement starts at 0 seconds at the time indicated in the first entry of the log and counts up consecutive seconds to the termination of the call. In Table 2 the RING state is indicated by the letter R, the INTER-RING state by the letter IR, the VOICE state by the letter V, the NO-VOICE state by the letter NV, the ON HOLD state by the letter H, and the IDLE state by the letter I. The last entry in the log is the detected coded signal which appeared on the data lines 72 and the elapsed time at which the coded signal was detected.

It will be appreciated that a log such as that shown in Table 2 defines a substantially complete history of a call, including the number of rings, the number of holding periods, the number of NO-VOICE periods, and the length of each logged period of time. In addition, as explained below in greater detail, the coded signal recorded in the log can be used in processing the log as a function of the purpose of the call.

The transmit interrupt routine of FIG. 6b is used for transmitting logged information such as that shown in the left-hand column of Table 2 from computer memory to an independent processor (not shown). As used herein, the term "processor" is intended broadly to encompass computer systems, modems, storage systems, and the like. The approach utilized in the transmit-interrupt routine of FIG. 6b is that individual bytes in a call data block are supplied to the serial I/O card 38 until the last byte has been supplied. When the entire log for a completed call has been transmitted, the transmit interrupt routine disables the transmit interrupt and clears the call data block. The serial I/O card 38 functions in the standard manner to transmit in an asynchronous manner bytes supplied to it by the transmit interrupt routine to a receiving processor. Such a receiving processor may be programmed to extract desired information from the transmitted logs in order to measure and characterize the patterns of usage of the calls on the telephone lines 10.

The main routine of FIG. 6 does little more than supervise the operation of the interrupt routines of FIGS. 6a and 6b. The main routine starts by initializing and then enabling the timer interrupt to allow line state to be determined and updated on a regular basis. The main routine then executes operator commands flagged by the timer interrupt routine, and reads the real time clock and updates the clock display. In the event any new call has been flagged as completed by the timer interrupt routine, the main routine then loads the log for the newly completed call into the call data block and initiates data output for a new completed call by enabling the transmit interrupt. The main routine then returns in a continuous loop.

The operation of the preferred embodiment shown in FIGS. 1-6b can be described as follows:

As incoming calls appear on the telephone lines 10, operators at the operator stations 20 use the receivers 22 to service the calls in the routine manner. The line activity monitor operates automatically to log the changes of state of each of the telephone lines during each conversation, and to generate a set of logs, each including information of the general type shown in Table 2. At any time during the conversation, the operator can utilize the Touch-Tone pad 24 to generate a coded signal which is detected by the line activity monitor 30 and recorded in the log for the associated call. Thus, for example, an operator could depress a first Touch-Tone key to signal that the incoming call is a credit inquiry, and a second key to signal that a call is a merchandise inquiry. Typically, the coded information will be sent after the call has been completed, but before the next call is handled. Such coded signals could also be used for information relating to a block of calls. For example, a particular code might inform a computer of the weather, so that further analysis would recognize that associated calls were handled during a rain storm, for example. The code could also be used to indicate which operator handled a particular call.

It should be understood that the present invention is not limited to the details of the preferred embodiment described above. For example, the coded signals can be sent by dial pulse recognition techniques rather than Touch-Tone techniques. Furthermore, a separate signalling system can be used to communicate the coded signals from the operator station to the line activity monitor, without relying on the telephone line. Alternately, when the telephone line is used for tone signalling in the manner described above, acoustical filters can be connected between the outside party and the line activity monitor to filter out specific tones and combinations of tones used to carry the coded signals so that an outside party does not hear the coded signals. Similarly, a tone encoding system can be used for the coded information which is in a higher acoustical range than that carried by conventional telephone equipment.

An important advantage of the embodiment described above is that it provides detailed information regarding the history of each call, and thereby maximizes the flexibility of further processing. Instead of recording summary statistics or specific types of information to a fixed degree of resolution, the embodiment described above records complete information regarding each call. This allows the recorded data to be processed as appropriate for any individual application. Thus, line usage reports can be tailored to the specific needs, problem areas, or interests of any individual application, without modification to the monitor 30.

The manner in which the illustrated embodiment distingushes between the presence or absence of voice when a line is in the SERVICED state can provide important additional information in situations in which operators place a call effectively on hold without utilizing the A and A1 leads. Furthermore, this feature of the invention allows a monitor to be used which records constructive on hold time (the NO-VOICE state) even when it is inconvenient or impossible to supply the monitor with the A and A1 leads of the telephone line. Thus, this feature of the invention allows nonproductive off-hook time to be measured as such, regardless of whether the line has been placed on hold or whether it is even possible to sense that the line has been placed on hold by the operator.

Of course, it should be understood that a wide range of changes and modifications to the preferred embodiments described above will be apparent to those skilled in the art. For example, the coded signal feature of the invention described above can be used in conjunction with other types of line activity monitors, such as that described in U.S. Pat. No. 4,270,024. It is therefore intended that the foregoing detailed description be regarded as illustrative rather than limiting, and that it be understood that it is the following claims, including all equivalents, which are intended to define the scope of this invention.

TABLE 1

| LINE STATES | |
|---|---|
| IDLE | No activity on telephone line. |
| RING | Ring signal present on telephone line. |
| INTER-RING | Between rings. |
| SERVICED | Line off hook and not on hold; includes the states of VOICE, in which the presence of voice signals is detected on telephone line, and NO-VOICE, in which the absence of voice signals is detected on telephone line. |
| ON HOLD | Off hook line placed on hold. |

TABLE 2

| EXAMPLE OF LOG FOR CALL ON LINE k | |
|---|---|
| k:hhmmss; | Call initiated on line k at clock time hh mm ss; |
| R:ET1; | Call entered RING state at elapsed time ET1; |
| IR:ET2; | Call entered INTER-RING state at elapsed time ET2; |
| R:ET3; | Call entered RING state at elapsed time ET3; |
| V:ET4; | Call entered VOICE state at elapsed time ET4; |
| NV:ET5; | Call entered NO-VOICE state at elapsed time ET5; |
| V:ET6; | Call entered VOICE state at elapsed time ET6; |
| H:ET7; | Call entered ON HOLD state at elapsed time ET7; |
| V:ET8; | Call entered VOICE state at elapsed time ET8; |
| I:ET9; | Call entered IDLE state at elapsed time ET9; |
| C:ET10. | Coded signal C entered by operator at elapsed time ET10. |

We claim:

1. An apparatus for monitoring line activity on at least one telephone line which carries incoming telephone calls from a calling party to a called party, said apparatus comprising:

a called party answering system comprising an operator station for servicing incoming calls on the telephone line, said operator station comprising means for transmitting voice messages between the telephone line and a called party operator;

a line activity monitor coupled to the telephone line to record information indicative of usage of the telephone line;

a signaling device, included in the called party answering system, for generating a plurality of called party selected coded signals following receipt of respective incoming calls on the telephone line, each of said coded signals indicative of coded information selected by the called party to be associated with respective incoming calls in order to classify the incoming calls;

means for supplying the coded signals as inputs to the monitor; and means, included in the monitor, for associating said coded signals with respective calls such that the monitor is responsive to the coded signals and said recorded information varies in accordance with the coded signals.

2. The invention of claim 1 wherein said monitor includes means for recording the coded information associated with each call and means for recording information indicative of the duration of each call.

3. The invention of claim 1 wherein the signalling device comprises a Touch-Tone pad.

4. The invention of claim 1 wherein the signaling device comprises a dial-pulse pad.

5. The invention of claim 1 wherein said monitor comprises means for recording the coded information associated with each call and means for recording information for each call indicative of the time each call entered one of a preselected set of line states, including at least two of the following: IDLE, ON HOLD, SERVICED, RING and INTER-RING.

6. The invention of claim 1 wherein the line activity monitor comprises:
   means for detecting when the telephone line enters one of a plurality of line states;
   means for recording a log for each of the calls on the telephone line, each log indicative of a time the telephone line entered each of the plurality of line states during each of the calls; and
   means for transmitting the recorded logs to an external processing system.

7. The invention of claim 6 wherein the plurality of line states comprises at least two of the following: IDLE, SERVICED, ON HOLD, RING and INTER-RING.

8. The invention of claim 6 wherein the plurality of line states comprises IDLE, RING, INTER-RING, VOICE, NO-VOICE and HOLD.

9. The invention of claim 1 wherein at least some of the coded signals are indicative of a purpose of the calling party in placing the respective incoming call.

10. The invention of claim 1 wherein at least some of the coded signals are indicative of a condition external to the incoming calls prevailing during the respective incoming call.

11. The invention of claim 1 wherein at least some of the coded signals are indicative of the nature of the associated incoming call as assessed by the called party.

12. An apparatus for monitoring line activity on at least one telephone line which carries incoming telephone calls from a calling party to a called party, said apparatus comprising:
   a called party answering system comprising an operator station for servicing incoming calls on the telephone line, said operator station comprising means for transmitting voice messages between the telephone line and a called party operator;
   a signaling device, included in the called party answering system, for generating a plurality of called party selected coded signals indicative of coded information selected by the called party to be associated with respective ones of the incoming calls in order to classify the incoming calls in categories selected by the called party;
   a line activity monitor coupled to the telephone line to record information indicative of usage of the telephone line;
   means for supplying the coded signals as inputs to the monitor;
   means, included in the monitor, for detecting when the telephone line enters one of a plurality of line states, including IDLE, HOLD, RING, INTER-RING, and SERVICED;
   means, included in the monitor, for recording a log for each of the incoming calls on the telephone line, each log indicative of a time the telephone line entered each of the plurality of line states during each of the calls; and
   means, included in the monitor, for recording in the log the coded signal associated with the respective incoming call.

13. The invention of claim 12 wherein the SERVICED state includes states corresponding to the presence and absence of voice signals on the telephone line, and wherein the monitor further comprises:
   voice detection means for classifying each call when in the SERVICED state either as in a VOICE state characterized by the presence of voice signals on the telephone line or as in a NO-VOICE state characterized by the absence of voice signals on the telephone line; and
   means for incorporating into the log for each of the incoming calls information indicative of the time the telephone entered the VOICE and NO-VOICE states during each of the calls.

14. A method for recording information characteristic of incoming calls on a telephone line comprising the following steps:
   providing an operator station for servicing calls on at least one telephone line, said operator station comprising means for transmitting voice messages between the telephone line and an operator and a signaling device for generating a plurality of manually selected coded signals indicative of coded information to be associated with respective ones of the incoming calls;
   providing a monitor coupled to the telephone line, said monitor comprising means for automatically recording traffic parameters indicative of usage of the line and means for automatically associating the coded signals with respective calls such that said recorded information automatically varies in accordance with the coded signals;
   servicing a call at the operator station;
   generating coded information at the operator station to be associated with the incoming call; and
   manipulating the signalling device to generate coded signals indicative of the coded information in order to cause the monitor automatically to associate the control signals with the call, thereby categorizing the incoming call.

15. The invention of claim 14 wherein the signaling device comprises a Touch-Tone pad and wherein said coded signals comprise respective audio tones.

16. The invention of claim 14 wherein the coded information is indicative of a purpose of a calling party in placing the respective incoming call.

17. The invention of claim 14 wherein the coded information is indicative of a condition external to the incoming calls prevailing during the respective incoming call.

18. The invention of claim 14 wherein the coded information is indicative of the nature of the associated incoming call.

19. An apparatus for monitoring line activity on at least one telephone line which carries incoming telephone calls from a calling party to a called party, said apparatus comprising:
   a called party answering system comprising an operator station for servicing calls on the telephone line, said operator station comprising means for transmitting voice messages between the telephone line and a called party operator;

a line activity monitor coupled to the telephone line to record information indicative of usage of the telephone line;

a signalling device, included in the called party answering system, for generating a plurality of manually selected coded signals following interconnection of respective calls on the telephone line, each of said coded signals indicative of coded information generated by the called party to be associated with respective ones of the incoming calls to classify the incoming calls in categories selected by the called party;

means for supplying the coded signals as inputs to the monitor; and means, included in the monitor, for associating said coded signals with respective calls such that the monitor is responsive to the coded signals and said recorded information varies in accordance with the coded signals.

20. The invention of claim 19 wherein said monitor includes means for recording the coded information associated with each call and means for recording information indicative of the duration of each call.

21. The invention of claim 19 wherein said monitor comprises means for recording the coded information associated with each call and means for recording information for each call indicative of a time each call entered one of a preselected set of states, including at least two of the following: IDLE, ON HOLD, SERVICED, RING and INTER-RING.

* * * * *